(No Model.)
J. P. B. FISKE.
TRANSMISSION OF ELECTRICITY.
No. 516,805. Patented Mar. 20, 1894.
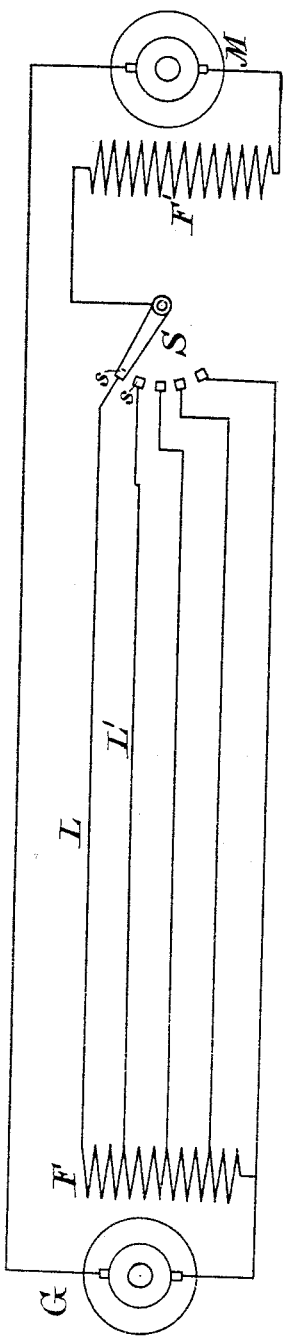
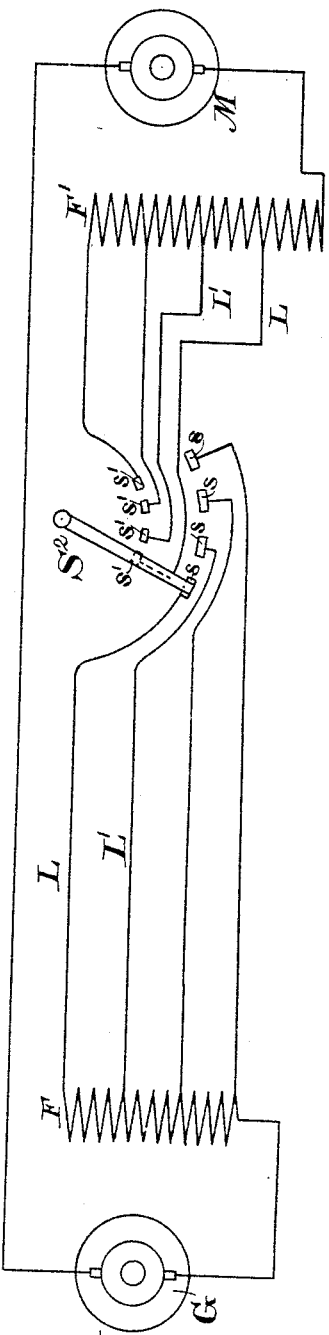
WITNESSES
INVENTOR
Jonathan P. B. Fiske

UNITED STATES PATENT OFFICE.

JONATHAN P. B. FISKE, OF LYNN, ASSIGNOR TO THE GENERAL ELECTRIC COMPANY, OF BOSTON, MASSACHUSETTS.

TRANSMISSION OF ELECTRICITY.

SPECIFICATION forming part of Letters Patent No. 516,805, dated March 20, 1894.

Original application filed May 3, 1893, Serial No. 472,832. Divided and this application filed October 19, 1893. Serial No. 488,663. (No model.)

*To all whom it may concern:*

Be it known that I, JONATHAN P. B. FISKE, a citizen of the United States, residing at Lynn, in the county of Essex and State of Massachusetts, have invented a certain new and useful Improvement in Transmission of Electricity, of which the following is a specification.

My invention relates to power transmission where the motor and generator are in series. In former methods it has been customary to provide two series machines connected in series, which arrangement provides a constant speed of motor irrespective of load, provided the generator runs at constant speed and the fields are practically of the same character, or differing only in that the field of the generator is somewhat stronger than that of the motor, in order to provide for the drop of potential, due to the resistance of the line and the machines. The use of such an arrangement is comparatively limited, as it provides for only a constant speed, while it is necessary in most cases to employ various speeds of the motor. I have provided means for employing series motors and dynamos with all the inherent advantages of this type of machine, while securing at the same time the essential variation of speed in the motor.

The system which I adopt consists in varying the field-magnet strength of either the generator or motors, both being series machines, or for extreme cases the field-magnet strength of both may be varied; and my invention consists in methods of so varying the field magnet strengths and in apparatus effecting such variations.

This application is a division of my former application, Serial No. 472,832, filed May 3, 1893, in which a similar method is disclosed, and an apparatus is shown adapted to carry out that method; it is therefore to be understood that in this application I do not claim that method, nor is any claim to be understood as embracing the apparatus shown in my former application, as herein I claim only the specific variation shown and described. In the former application I have shown as a means of changing the field strength, resistances adapted to throw more or less current through the field-magnet coils; but in this application I show how the same result may be accomplished by varying the active lengths of the field-magnet coils.

In the accompanying drawings hereby referred to and made part of this specification, Figures 1 and 2 are diagrammatic illustrations of apparatus embodying my invention.

Like letters refer to like parts throughout.

In the drawings G is a generating armature, F is its field-magnet coil.

L, L' are leads connected at different points in the length of the field-magnet coil, each of such leads being provided with a contact $s, s$, &c., for a switch S; M is the motor armature and F' is the motor field-magnet coil. In the arrangement thus shown, if it is desired to vary the speed of the motor, the switch S would be thrown to one or the other of the contact blocks $s, s$, &c., thus throwing into circuit more or less of active length of the field-magnet coil F, and furnishing a greater or less electro-motive-force to the motor, varying its speed in a well-known way.

In Fig. 2 I show how a switch may be employed to vary the active lengths of the field-magnet coils in both the generator and motor; this switch I have marked $S^2$, the other letters remaining the same, except that I have marked the contact blocks of the motor leads $s', s'$, &c. It will be seen that as the switch is shown in the drawings only the lower one-fourth of the field-magnet coil F' is in circuit, while the entire field-magnet coil F of the generator is contributing electro-motive-force to the system, which thus drives the motor at its highest rate of speed. As the switch is shifted to the right, however, it cuts out successive sections of the generator field-magnet coil and cuts in at the same time successive sections of the motor field-magnet coil, thus diminishing the electro-motive force and increasing the strength of the motor field, tending, as is well known, to slow down the motor.

Having thus described my invention, what I claim as new, and desire to protect by Letters Patent of the United States, is—

1. In combination, a generator having a field-magnet whose series coil is divided into sections, a series-wound motor taking current from the generator and a switch adapted to short-circuit or cut in the sections of the field-magnet coil of the generator, and thereby vary the speed of the motor, substantially as described herein.

2. In combination, a series-wound generator, having its field-magnet coil provided with short-circuiting leads from different points in its length, a series motor having its field magnet coil similarly divided inversely, and a double pole switch adapted to connect the leads; whereby the field magnet strengths of the generator and the motor may be inversely varied and the speed of the motor regulated, substantially as herein described.

In witness whereof I have hereunto set my hand this 16th day of October, 1893.

JONATHAN P. B. FISKE.

Witnesses:
JOHN W. GIBBONEY,
BENJAMIN B. HULL.